United States Patent
Blum et al.

(10) Patent No.: US 10,696,169 B2
(45) Date of Patent: Jun. 30, 2020

(54) CHARGING STATION FOR AN ELECTRICALLY POWERED VEHICLE, AND CHARGING METHOD

(71) Applicant: SIEMENS AKTIENGESELLSCHAFT, Munich (DE)

(72) Inventors: Manuel Blum, Ottobrunn (DE); Thomas Komma, Ottobrunn (DE); Mirjam Mantel, Munich (DE); Monika Poebl, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 566 days.

(21) Appl. No.: 14/499,427

(22) Filed: Sep. 29, 2014

(65) Prior Publication Data

US 2015/0091516 A1  Apr. 2, 2015

(30) Foreign Application Priority Data

Sep. 27, 2013 (DE) .......................... 10 2013 219 534

(51) Int. Cl.
  *H02J 7/02* (2016.01)
  *H02J 50/80* (2016.01)
  *H02J 50/10* (2016.01)
  *H02J 50/12* (2016.01)
  *H01F 38/14* (2006.01)
  *B60L 53/12* (2019.01)
  (Continued)

(52) U.S. Cl.
  CPC ............. *B60L 11/182* (2013.01); *B60L 50/52* (2019.02); *B60L 53/12* (2019.02); *B60L 53/22* (2019.02); *B60L 53/30* (2019.02); *B60L 53/51* (2019.02); *B60L 53/52* (2019.02); *B60L 53/53* (2019.02); *B60L 53/54* (2019.02); *B60L 53/57* (2019.02); *B60L 55/00* (2019.02); *B60L 53/122* (2019.02);
  (Continued)

(58) Field of Classification Search
  CPC . H02J 7/025; H02J 50/12; H02J 50/90; B60L 11/182
  USPC .................................................. 320/108, 109
  See application file for complete search history.

(56) References Cited

U.S. PATENT DOCUMENTS 5,491,715 A * 2/1996 Flaxl .................... G06K 7/0008
                                                       333/17.3
6,570,370 B2 * 5/2003 Tupper .............. H02M 7/53871
                                                       323/293

(Continued)

FOREIGN PATENT DOCUMENTS

CN  102856964 A  1/2013
CN  103166329 A  6/2013
(Continued)

*Primary Examiner* — Drew A Dunn
*Assistant Examiner* — Tarikh Kanem Rankine
(74) *Attorney, Agent, or Firm* — Laurence Greenberg; Werner Stemer; Ralph Locher

(57) ABSTRACT

A charging station for an electrically powered vehicle has a connection for an electrical energy source, an inverter and an electronic coil connected to the inverter for wireless energy-transferring coupling of the electrically powered vehicle. The inverter is configured to apply an alternating electric voltage to the electronic coil in resonant operation. The electronic coil is connected to the inverter by way of a compensating circuit with a settable passive electronic energy storage device. The compensating circuit is configured to set a frequency of the alternating voltage by means of the settable passive electronic energy storage device.

7 Claims, 2 Drawing Sheets

(51) Int. Cl.
- *B60L 11/18* (2006.01)
- *B60L 53/52* (2019.01)
- *B60L 53/57* (2019.01)
- *B60L 53/22* (2019.01)
- *B60L 50/52* (2019.01)
- *B60L 53/51* (2019.01)
- *B60L 53/54* (2019.01)
- *B60L 55/00* (2019.01)
- *B60L 53/53* (2019.01)
- *B60L 53/30* (2019.01)
- *B60L 53/122* (2019.01)

(52) U.S. Cl.
CPC ....... *B60L 2210/30* (2013.01); *B60L 2210/40* (2013.01); *B60L 2260/58* (2013.01); *Y02E 60/721* (2013.01); *Y02T 10/7005* (2013.01); *Y02T 10/7088* (2013.01); *Y02T 10/7241* (2013.01); *Y02T 90/121* (2013.01); *Y02T 90/122* (2013.01); *Y02T 90/127* (2013.01); *Y02T 90/128* (2013.01); *Y02T 90/14* (2013.01); *Y02T 90/163* (2013.01); *Y04S 10/126* (2013.01)

(56) References Cited

U.S. PATENT DOCUMENTS

| | | | |
|---|---|---|---|
| 9,124,114 B2* | 9/2015 | Haruyama | H02J 5/005 |
| 2010/0109445 A1* | 5/2010 | Kurs | B60L 11/007 |
| | | | 307/104 |
| 2010/0259110 A1* | 10/2010 | Kurs | B60L 11/182 |
| | | | 307/104 |
| 2010/0277121 A1* | 11/2010 | Hall | B60L 53/60 |
| | | | 320/108 |
| 2011/0254377 A1* | 10/2011 | Wildmer | B60L 11/182 |
| | | | 307/104 |
| 2012/0038220 A1* | 2/2012 | Kim | H02J 7/025 |
| | | | 307/104 |
| 2014/0084857 A1* | 3/2014 | Liu | H02J 5/005 |
| | | | 320/108 |

FOREIGN PATENT DOCUMENTS

| | | |
|---|---|---|
| JP | 2010233354 A | 10/2010 |
| JP | 2011155732 A | 8/2011 |
| JP | 2011155733 A1 | 8/2011 |
| KR | 20120016521 A | 2/2012 |

\* cited by examiner

CHARGING STATION FOR AN ELECTRICALLY POWERED VEHICLE, AND CHARGING METHOD

CROSS-REFERENCE TO RELATED APPLICATION

This application claims the priority, under 35 U.S.C. § 119, of German patent application DE 10 2013 219 534.6, filed Sep. 27, 2013; the prior application is herewith incorporated by reference in its entirety.

BACKGROUND OF THE INVENTION

Field of the Invention

The present invention relates to a charging station for an electrically powered vehicle. The charging station has a connection for an electrical energy source, an inverter and an electronic coil connected to the inverter for wireless energy-transfer coupling of the electrically powered vehicle. The inverter is configured to apply an alternating electric voltage to the electronic coil in resonant operation. The invention further relates to a method for operating a charging station for an electrically powered vehicle wherein the charging station draws electrical energy from an electrical energy source connected to the charging station and, by means of an inverter and an electronic coil in resonant operation connected to the inverter, generates an alternating electric voltage, by way of which the electronic coil provides an alternating magnetic field for wireless energy-transferring coupling of the electrically powered vehicle. Finally, the invention relates to a computer program product comprising a program for a computer unit of a charging station.

Charging stations of the generic type and methods for operation thereof for the wireless transfer of energy by means of an alternating magnetic field are known per se, so that no special written disclosure thereof is required. Charging stations of the generic type serve to supply an electrically powered vehicle with energy during charging operation so that the electrically powered vehicle can perform its intended function. The electrically powered vehicle requires the energy for drive operation.

The energy is provided by way of the alternating magnetic field of the charging station which itself is connected to an electrical energy source, for example, to a public energy supply network or mains, to an electric generator, a battery and/or the like. The charging station generates the alternating magnetic field while receiving electrical energy from the electrical energy source. The electrically powered vehicle detects the alternating magnetic field by means of a suitable electronic coil, absorbs energy therefrom and makes electrical energy available on the vehicle side, particularly in order to supply an electrical energy storage device of the vehicle and/or to supply an electric machine of a drive apparatus of the vehicle with electrical energy.

One possibility for feeding the energy from the charging station to the charging device of the vehicle consists therein that an electrical connection is created as an energy-transferring coupling by means of a cable between the vehicle and the charging station. According to a further possibility, it is also known to create a wireless energy-transferring coupling which avoids a complex mechanical connection by means of a cable. For this purpose, in general, provided on each of the charging station side and the vehicle side is a coil circuit with an electronic coil, the coil circuits being arranged essentially opposing one another during a charging process and enabling an energy-transferring coupling, making use of an alternating magnetic field. Such an arrangement is described, for example, in Korean published patent application KR 10 2012 0 016 521 A.

In systems wherein energy is transferred by means of an alternating magnetic field, also known as inductive energy transfer, the inductances of the two coil circuits involved can be substantially changed by varying the distance and/or an offset. In known systems, this results in a substantial change in the operating frequency, that is, the frequency of the alternating magnetic field. If the parameters of the coil circuits, in particular of the electronic coils, change beyond a comparison value, this results in a lessening of the efficiency so that a pre-determined rated power level can no longer be transferred.

One possibility for being able to adapt the operating frequency is based on the use of variable capacitance diodes in order to achieve frequency tuning. A use of this type of frequency tuning in systems for inductive energy transfer, for example, for the purpose of charging an energy storage device of an electric vehicle is complex to implement. It is achievable only in a limited tuning range. Furthermore, due to the voltages arising and the power levels to be transferred during the intended operation, a complex series and parallel connection of variable capacitance diodes is necessary. In order to be able to counteract the change in the operating frequency occurring during the intended operation, a correspondingly greater circuit complexity is necessary.

Inductive energy transfer suffers from the problem that the power level transferrable and the efficiency are dependent on an air gap between the charging station and the electrically powered vehicle, as well as on an offset range. With a pre-determined system design, a satisfactory operation as intended can therefore only be achieved within a small air gap range as well as a narrow load and offset range. The power transferred can only be set by means of a change in the operating frequency. However, this measure is usable only to a very limited extent on account of normative limits and pre-conditions.

For the purpose of compensation, it is therefore provided in the prior art that compensating circuits are connected between the converter and the electronic coils, the compensating circuits being able to compensate for the electrical reactive voltages with the aid of capacitors. These circuits can be provided both on the primary side and on the secondary side. In practical operation, it has been found that sufficient compensation cannot be achieved in all operating states with a conventional capacitor-based compensating circuit.

In inductive energy transfer, that is, on use of an alternating magnetic field for energy transfer, the operating frequency of the inverter, that is, a frequency of the alternating voltage, is heavily dependent on an air gap formed between the electronic coil of the charging station and an electronic coil of the electrically powered vehicle during charging, as well as on an offset range of the two electronic coils relative to one another. However, a variation in the operating frequency is severely restricted due to normative requirements.

SUMMARY OF THE INVENTION

It is accordingly an object of the invention to provide a charging station for an electrically powered vehicle, as well as an improved charging process, which overcome the disadvantages of the heretofore-known devices of this general type and which provide for a charging operation in which the dependency of the operating frequency on the air gap and the offset range can be reduced.

With the above and other objects in view there is provided, in accordance with the invention, a charging station for an electrically powered vehicle, the charging station comprising:

a connection for an electrical energy source and an inverter connected to the connection for the electrical energy source;

an electronic coil configured for wireless energy-transfer coupling of the electrically powered vehicle;

the inverter being configured to apply an alternating electric voltage to the electronic coil in resonant operation; and a compensating circuit having a settable passive electronic energy storage device, the compensating circuit connecting the electronic coil to the inverter, and the compensating circuit being configured to set a frequency of the alternating voltage by way of the settable passive electronic energy storage device.

In other words, the invention proposes, in particular, that the electronic coil be connected, by means of a compensating circuit with a settable passive electronic energy storage device, to the inverter. The compensating circuit is configured to set a frequency of the alternating voltage by way of the settable passive electronic energy storage device.

Accordingly, from the standpoint of the method, the invention proposes, in particular, that the electronic coil is operated, by means of a compensating circuit with a settable passive electronic energy storage device at the inverter and that a frequency of the alternating voltage is set by means of the compensating circuit.

It is possible with the invention essentially to pre-determine the frequency of the alternating voltage, that is, the working voltage on the charging station side and only to ensure the settability in the charging station. By this means, simplified control and regulation can be achieved overall, with which the normative pre-conditions can be maintained with regard to the operating frequency. It can therefore be achieved by means of the invention that decoupling of the effects on the operating frequency of the electrically powered vehicle takes place during charging operation, so that the influence of the electrically powered vehicle on the operating frequency can be significantly reduced if not even suppressed altogether. The invention makes use of the understanding that the inductance of the charging station-side electronic coil is substantially greater than an inductance of an electronic coil provided on the vehicle side for creating the wireless energy-transfer coupling for the purpose of the inductive energy transfer. It has been found that, given an inductance ratio of the charging station-side electronic coil to the vehicle-side electronic coil of at least approximately 10:1, good decoupling can be achieved with regard to the operating frequency. Preferably, a coupling factor between the charging station-side electronic coil and the vehicle-side electronic coil is less than 50 percent.

The invention takes into account that on the charging station side, the inverter with the electronic coil is used in resonant operation. This means that the operating frequency is significantly influenced by properties of the alternating magnetic field generated by the electronic coil. In order to counteract this, on the charging station side, the compensating circuit with the passive electronic energy storage device is provided, with which the influence on the operating frequency can be reduced. For this purpose, the passive electronic energy storage device is configured settable so that it can be adapted to the prevailing requirements in order to keep the operating frequency within a pre-determined frequency band which is pre-determined, in particular, by the normative default settings. As distinct from the requirements of the prior art, with the invention, it is now not necessary to operate the inductive energy transfer system with a small air gap and a very small offset tolerance and, furthermore, at a constant power transfer rate. In this regard, the invention is able to achieve a significant improvement.

Inductive energy transfer and wireless energy-transferring coupling in the context of the invention is a coupling for the purpose of the transfer of energy which enables energy to be transferred at least unidirectionally from an energy source to an energy sink. The energy source can be, for example, a public energy supply network, an electric generator, a solar cell, a fuel cell, a battery, combinations thereof and/or the like. The energy sink can be, for example, a drive apparatus of the electrically powered vehicle, in particular an electric machine of the drive apparatus and/or an electric energy storage device of the drive apparatus, for example, an accumulator or the like. However, a bidirectional energy transfer can also be provided, that is, energy transfer alternately in both directions. This purpose is served, inter alia, by the charging station, which is intended to transfer energy to the electrically powered vehicle, for which purpose the charging station draws electrical energy from an energy source to which it is electrically connected.

Wireless energy-transferring coupling or inductive energy transfer in the context of the invention means that no mechanical connection needs to be provided between the charging station and the electrically powered vehicle in order to establish an electrical coupling. In particular, the establishment of an electrical connection by means of a cable can be avoided. In place thereof, the energy-transferring coupling takes place purely on the basis of an energy field, preferably an alternating magnetic field.

The charging station is therefore set up to generate a corresponding energy field, in particular an alternating magnetic field. On the vehicle side, it is provided accordingly that an energy field or an alternating magnetic field of this type can be detected and energy is obtained therefrom for the intended operation of the electrically powered vehicle. By means of the charging device of the vehicle, the energy supplied by means of the energy field, in particular the alternating magnetic field is converted into electrical energy which can then preferably be stored in the energy storage device of the vehicle for the intended operation thereof. For this purpose, the charging device can have a converter which converts the energy extracted from the alternating magnetic field by means of the coil and fed to the converter into electrical energy suitable for the vehicle, for example rectifies or voltage-transforms the energy or the like. Furthermore, the energy can also be fed directly to the electric machine of the drive apparatus of the vehicle. The energy-transferring coupling therefore serves essentially for the transference of energy and not primarily the transference of information. Thus, the means for carrying out the invention are configured for a correspondingly high power throughput, in contrast to a wireless communication connection.

A primarily important element for a wireless energy-transferring coupling, in particular by way of the alternating magnetic field, is the electronic coil, which can possibly also constitute a plurality of electronic coils which, on the charging station side, serves to generate the alternating magnetic field and, on the vehicle side, is pervaded by the alternating magnetic field and, on the vehicle side, supplies electrical energy at the corresponding terminals thereof. Accordingly, on the charging station side, the electronic coil has an alternating voltage applied thereto, which brings about an alternating current, so that the electronic coil provides the alternating magnetic field by means of which energy can be output. By means of the alternating magnetic field, the electronic coil of the charging station is coupled with the electronic coil of the electrically powered vehicle during a charging process.

Typically, the coil has a winding with a plurality of windings of an electric conductor wherein the winding typically has a ferromagnetic body which is often made of, or comprises, a ferrite. By means of the ferromagnetic body, the magnetic flux can be guided in the desired manner so that the effectiveness of the energy-transferring coupling due to the alternating magnetic field between the coil circuits of the charging station and of the electrically powered vehicle can be increased.

The electrical conductor forming the windings of the electronic coil is often configured as a high-frequency litz wire. That is, the wire consists of a large number of individual conductors or wires which are electrically insulated relative to one another and which, accordingly are grouped together to form the conductor. It is thereby achieved that for frequency uses as per the invention, a current-displacement effect is reduced or is largely prevented. In order to achieve the most uniform possible current distribution to the individual strands of the high-frequency litz wire, twisting of the individual strands is also provided. Twisting can also include the formation of bundles from a particular number of individual wires which are twisted within each bundle, wherein said bundles forming the electrical conductors are also twisted.

A passive electronic energy storage device is distinguished in that said store generates and/or uses essentially no electrical energy. It is preferably an electronic component such as an inductance, for example a coil, a capacitor, combinations thereof or the like. The passive electronic energy storage device serves to influence the properties of the electronic coil in conjunction with the inverter in a desired pre-definable manner in order to be able to achieve the least possible variation of the operating frequency. Said energy storage device is therefore, in particular not a galvanic cell, that is, not a battery or an accumulator. The passive electronic energy storage device is therefore to be distinguished from the electrical energy storage device, which can be provided by an accumulator, a battery or the like and essentially serves as part of an electrical energy supply, for example, as an energy source and/or an energy sink.

The compensating circuit preferably uses a capacitor as a passive electronic energy storage device. Furthermore, it can naturally also be provided that more than one capacitor, in particular networks of capacitors or networks of coils, for example, in conjunction with capacitors, can be used.

According to one aspect of the invention, it is proposed that the passive electronic energy storage device is configured in multiple parts and at least one of the parts of the multi-part passive electronic energy storage device thus formed can be activated by means of an associated switching element. Accordingly, it can naturally be provided that the corresponding part of the multipart passive electronic energy storage device can also be deactivated or activated and deactivated.

A switching element within the meaning of this disclosure is preferably a controllable electronic switching element, for example, an electromechanical switching element in the form of a relay, a contactor or the like or, alternatively a controllable electronic semiconductor switch, for example, a transistor, a thyristor, combination circuits therefrom, in particular an anti-parallel connection of two thyristors, an anti-serial connection of two transistors, preferably with parallel-connected freewheeling diodes, a TRIAC, a GTO, IGBT, combinations thereof or the like. Preferably, the switching element is controllable by means of the control unit. The control unit preferably determines the conditions which determine the activation or deactivation of the corresponding part of the multi-part passive electronic energy storage device. For this purpose, the control unit can detect relevant parameters, for example of the converter, of the compensating circuit, of the coil circuit or the like, by means of sensors. Parameters can be, for example, an electric current, an electric voltage, an electric power, a phase shift between an electric voltage and an associated electric current, a local magnetic field strength, an electric power, combinations thereof and/or the like.

It has proved to be particularly advantageous if the compensating circuit comprises an electronic network with a plurality of passive electronic energy storage devices. By this means, a region for adaptation or adjustment of the energy-transferring coupling can be extended. Preferably, some and particularly all of the passive electronic energy storage devices can be activated and/or deactivated by means of at least one switching element.

Preferably, the compensating circuit can have an electronic network with a plurality of passive electronic energy storage devices as described above. This allows the compensating circuit to be configured highly flexibly and makes it possible to achieve good adjustment for setting the operating frequency. According to a further embodiment, it is proposed that the passive electronic energy storage device is formed by a capacitor or a capacitor arrangement. In particular, the capacitor can be connected in series with the electronic coil. In this configuration, the compensating circuit is particularly well suited to being able to set the operating frequency. The capacitor can be, for example, an adjustable capacitor which can be set, with regard to the value of its capacitance, by means of a setting device. It has been found to be particularly advantageous if the capacitor is formed by a plurality of capacitors which are connected in parallel and/or series and can be activated or deactivated as needed. In this way, a discretely settable overall capacitor can be formed, with which the desired settability can be achieved by simple means.

It has proved to be particularly advantageous if the capacitor or part of the capacitor or a capacitor arrangement of the compensating circuit is activatable or deactivatable by means of at least one switching element. For this purpose, the switching element itself can be formed by a semiconductor switching element or a switching unit comprising a plurality of semiconductor switching elements.

According to a further aspect, the charging station has a control device for setting the compensating circuit depending on a power level transferred by means of the alternating magnetic field and/or on an efficiency level of the energy transfer. The control device can thus serve, by acting on the settable compensating circuit, to be able to achieve the optimum possible, preferably pre-determined intended operation. The device can be formed by a hardware circuit, an analog or a digital computer unit, in particular based on at least one operational amplifier, combinations thereof or the like.

According to a further development, the switching element is formed by a semiconductor switching element or a switching unit comprising a plurality of semiconductor switching elements. Preferably, the switching element is configured in order to be able to conduct an electric current in each current direction. A semiconductor switching element can be, as discussed above, a transistor, a thyristor or the like. The switching unit is preferably formed by at least two semiconductor switching elements which are connected in a suitable manner to achieve the intended function. For example, a parallel circuit arrangement of thyristors can be provided which are connected in parallel and in opposition with regard to the conducting direction thereof, i.e. antiparallel. Alternatively, in place of a parallel arrangement of this type, a TRIAC can be used which enables controlled connection in both current-flow directions, as distinct from a single thyristor. The switching unit can comprise, if it has transistors, for example, a series connection of two transistors wherein, in the case of bipolar transistors, the injectors, in the case of MOSFET the corresponding source terminals are electronically connected to one another. The terminals of the switching element thus provided as the switching unit are each formed by the collectors or the drain terminals. In the case of the switching unit with transistors, freewheeling diodes can also be provided. By means of the switching unit or the semiconductor switching element, highly variable, efficient and rapid control or execution of switching processes can be achieved. As compared with an electromechanical switching element, a lower power loss, a higher switching speed and also a higher reliability due to a lower level of wear can be achieved.

According to a further aspect of the invention, it is proposed that the frequency of the alternating voltage is regulated by means of the compensating circuit in relation to a frequency reference value. Accordingly, it is possible to pre-determine a frequency for the operating frequency and to operate the charging station, that is, in particular the inverter in conjunction with the electronic coil and the compensating circuit such that the operating frequency essentially corresponds to the reference frequency. For this purpose, a suitable regulating unit can be provided which can be a component of the charging station. Particularly advantageously, said regulating unit is integrated into a control unit for the inverter. The operating frequency in resonant operation can be determined by means of a sensor and, from this, control signals for the inverter can be generated, so that the operating frequency adjusts its value to the value of the reference frequency. For this purpose, it can also be provided that the compensating circuit, in particular controllable switching elements are controlled by the regulating unit in order to enable the resonant operation at the operating frequency pre-determined by the reference frequency. By this means, the maintenance of normative default settings can be significantly improved.

Accordingly, the invention also includes a computer program product of the generic type, wherein the product has program code segments of a program for carrying out the method according to the invention when the program is executed by the computer unit of the control device. The aforementioned computer program product can be configured as a computer-readable storage medium. Furthermore, the program can be loadable directly into an internal memory of the computer unit. It is, for example, possible to download the program from a network out of a data source, for example, a server and into an internal memory of the computer unit, so that the computer can execute the program.

Preferably, the computer program comprises a computer-readable medium on which the program code segments are stored. A computer-readable medium of this type can be, for example, a memory chip, a compact disk, a USB stick or the like.

Other features which are considered as characteristic for the invention are set forth in the appended claims.

Although the invention is illustrated and described herein as embodied in charging station for an electrically powered vehicle and a related charging method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
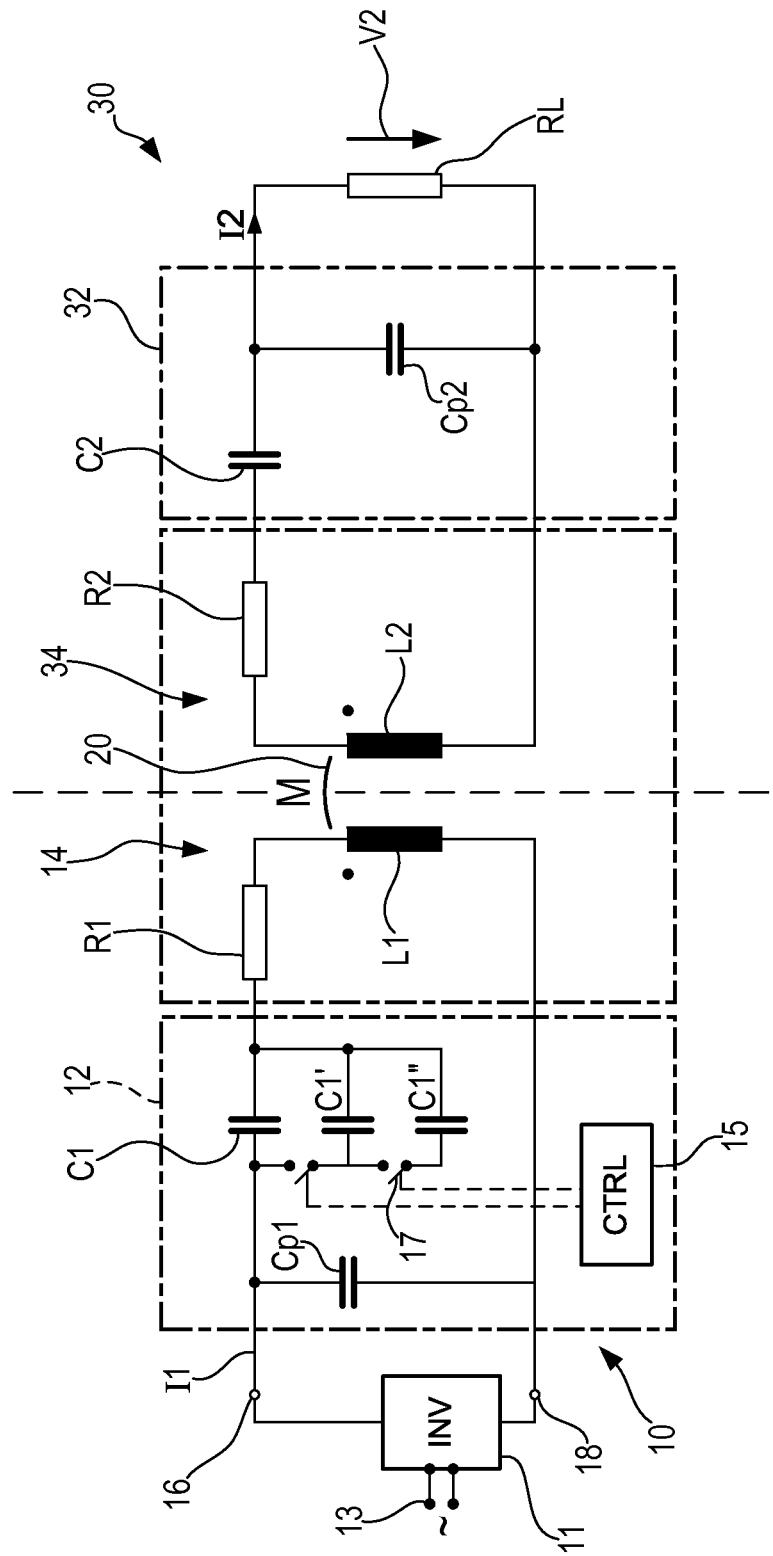
FIG. 1 is a schematic illustration showing the principle of a system formed from a part of a charging station and a part of an electrically powered vehicle, which serves for the wireless inductive energy transfer.

FIG. 1 shows a schematic circuit diagram illustrating the principle of a section of a charging station 10 with wireless energy-transfer coupling by way of a magnetic field 20 with a corresponding section of a circuit showing the principle of an electrically powered vehicle during charging operation.

On the charging station side, a coil arrangement 14 with an electronic coil L1 is provided which is connected in series with an electrical resistor R1. The resistor R1 represents the resistive losses of the charging station-side arrangement. The coil circuit 14 is connected to a compensating circuit which connects a capacitor C1 in series with the coil circuit 14. A capacitor Cp1 is also connected in parallel with this series connection. The compensating circuit 12 also has terminals 16, 18 by means of which the circuit is connected to an inverter (INV) 1 of the charging station 12. The inverter 11 is supplied from an energy supply 13, such as a mains, a battery, a generator, or the like, summarily identified 13. The charging station-side arrangement thereby formed serves to generate the alternating magnetic field 20 for the purpose of the wireless energy transfer and operates in resonant operation. This means that the inverter, the compensating circuit 12 and the coil arrangement 14 are operated so that the operating frequency uses a resonance generated thereby.

The capacitors C1 and Cp1 thus constitute the passive electronic energy storage device of the compensating circuit 12. The capacitor C1 is configured to be settable, adjustable. For this purpose, the capacitor C1 consists of a plurality of capacitors connected in parallel which can be selectively activated or deactivated by means of electronic semiconductor switches 17 in that the semiconductor switches 17 switch the relevant capacitors on or off.

A control unit 15 comprises a sensor by means of which the resonant frequency of the resonant operation can be determined. At the same time, the control unit for each of the semiconductor switches 17 has a control signal so that the control unit can control the switching on and off of the individual capacitors. The control unit 15 comprises a closed-loop control unit, or regulating unit, by way of which, through suitable switching of the semiconductor switches, the operating frequency can be set to a frequency that substantially corresponds to a reference frequency which can be set in advance. The reference frequency can be pre-defined, for example, by an operator or the like and is preferably selected such that normative default settings can be maintained.

It is also apparent from FIG. 1 that a coil L2 of the electrically powered vehicle is pervaded by the magnetic field 20. The coil L2 is a constituent of a coil circuit 34 which also comprises an electrical resistor R2 which is connected in series with the coil L2. The resistor R2 represents the losses in the vehicle-side arrangement. The electrically powered vehicle also comprises a compensating circuit 32 which is connected to the coil circuit 34. The compensating circuit 32 has a capacitor C2 which is connected in series with the coil circuit 34. In addition to this series connection, the compensating circuit 32 also comprises a capacitor Cp2 connected in parallel. Also connected to the compensating circuit, that is, in parallel with the capacitor Cp2, is an electrical resistor RL which encompasses the further electrical components of the electrically powered vehicle. For example, the resistor RL comprises a converter which converts the electrical voltage supplied by the coil L2 into a voltage which is suitable for the electrically powered vehicle 30. The resistor RL also comprises an accumulator and an electric machine connected to the accumulator for a drive apparatus of the electrically powered vehicle 30.

In the present embodiment of the arrangement shown in FIG. 1, a value of the inductance of the electronic coil L1 is approximately a factor of 10 greater than a value of the inductance of the electronic coil L2. Furthermore, a coupling factor between the two electronic coils L1, L2 50%. In this way, the inductive transfer system thereby formed has only a weak coupling. As a consequence, a reverse coupling effect of the electrically powered vehicle during charging operation on the charging station and here in particular on the operating frequency is very limited, so that the operating frequency is essentially determined on the charging station side. In this way, using the compensating network 12 of the charging station 10, a reliable setting of the operating frequency can be ensured. A dependency between the air gap between the electronic coils L1 and L2 as well as an offset and a variation of the power level of the energy transfer can thereby be reduced.

By this means, the operating frequency can be kept substantially constant.

It is therefore an aspect of the invention that the greatest possible decoupling of the reverse effect of the electrically powered vehicle on the operating frequency can be achieved.

Figure 2:
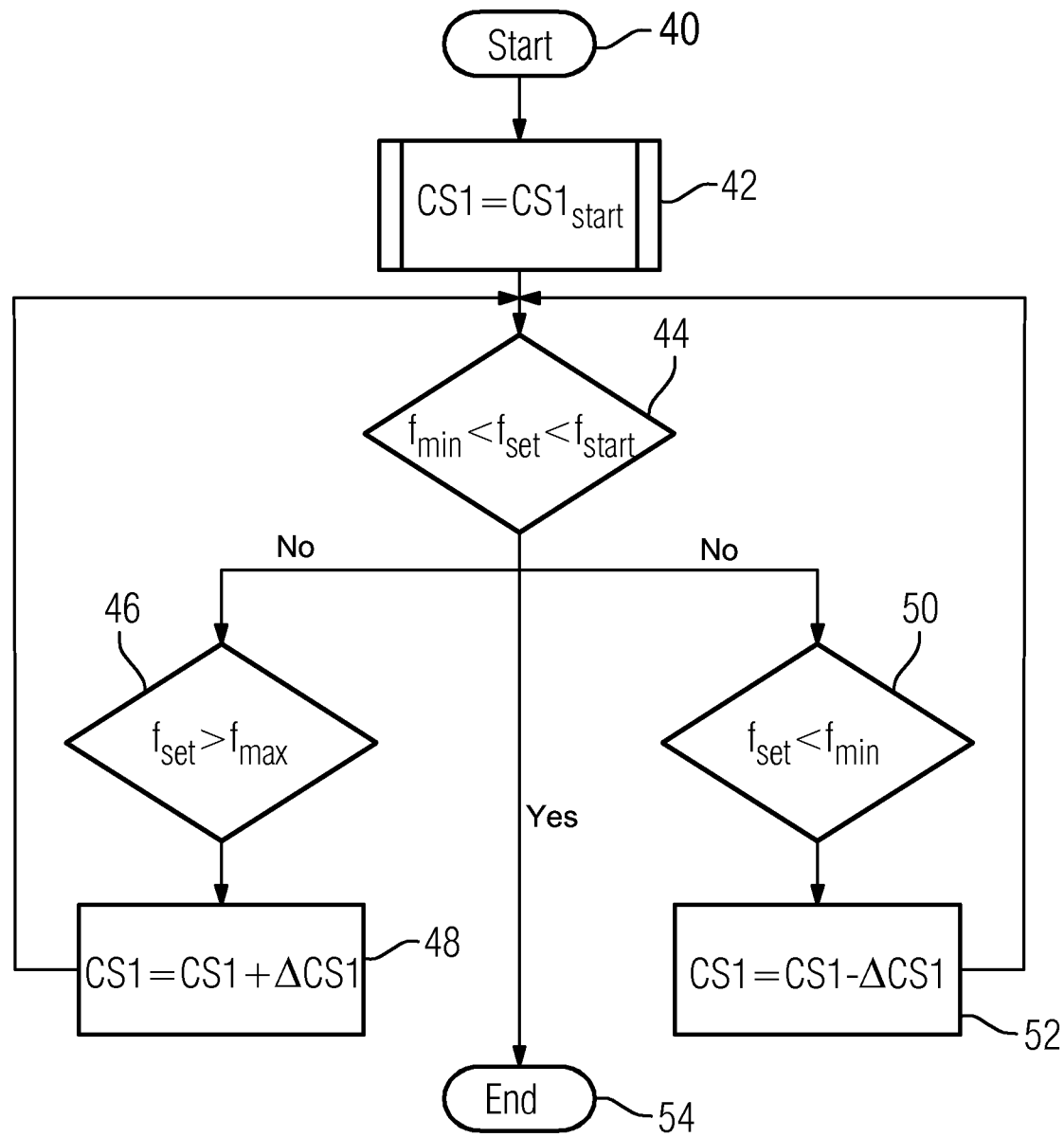
FIG. 2 is a schematic flow diagram for setting the operating frequency during a charging operation of the electrically powered vehicle at the charging station.

FIG. 2 shows, in the form of a flow chart, the sequence of a method for setting the operating frequency with the aid of the capacitor C1 of the compensating circuit 12 of the charging station 10. There follows a step 42 in which a value for a capacitor C1 is set to an initial value, specifically in that CS1 is set equal to $CS1_{start}$. Then follows a comparability test in step 44 in which an actual frequency $f_{set}$ is determined and is compared with a minimum frequency $f_{min}$ and a maximum frequency $f_{max}$. If the value of the frequency $f_{set}$ lies within a range formed by the frequencies $f_{min}$ and $f_{max}$, then the method ends in step 54.

If, however, in step 46 the frequency $f_{set}$ is greater than the maximum frequency $f_{max}$, then in step 48, the value for the capacitor C1, specifically the variable CS1, is increased by a pre-settable amount ΔCS1. The increase in this value has the effect that the operating frequency is reduced. The method is then continued with the comparison in step 44.

If it is determined in step 44 that the frequency $f_{set}$ lies outside the frequency range pre-set in step 44 and if it is determined in step 50 that the frequency $f_{set}$ is smaller than the minimum frequency $f_{min}$, then in step 42, a change is made in the variable CS1 such that the variable is reduced by a pre-settable amount ΔCS1. The method is then continued in step 44 and the frequency $f_{set}$ then set is made the basis for the comparison undertaken there.

The process is continued until the frequency $f_{set}$ lies within the frequency range covered by the minimum frequency $f_{min}$ and the maximum frequency $f_{max}$.

Purely for the sake of completeness, it should be noted that the power transferred and the efficiency can be set on the vehicle side with the compensating circuit, specifically with the capacitor C2 and the capacitor Cp2.

The preceding exemplary embodiment is intended merely to illustrate and not to restrict the invention. Naturally, a person skilled in the art would provide suitable variations as needed without departing from the central concepts of the invention.

Naturally, individual features can be combined with one another in any required manner as needed. Furthermore, device features can naturally also be disclosed through corresponding method steps and vice versa.

The invention claimed is:

1. A charging station for an electrically powered vehicle, the charging station comprising:
    a connection for an electrical energy source and an inverter connected to said connection for the electrical energy source;
    an electronic coil configured for wireless energy-transfer coupling with an electronic coil of the electrically powered vehicle, said electronic coil of the charging station having an inductance that is greater than an inductance of the electronic coil of the electrically powered vehicle, and the electronic coils having a coupling factor of less than or equal to 50%;
    said inverter being configured to apply an alternating electric voltage to said electronic coil of the charging station at a predetermined operating frequency in resonant operation; and
    a compensating circuit connecting said electronic coil to said inverter, said compensating circuit having a settable passive electronic energy storage device configured to adjust a frequency of the alternating voltage to the predetermined operating frequency, said settable passive electronic energy storage device including a plurality of capacitors connected in parallel with one another and a plurality of semiconductor switches respectively connected to each of said plurality of capacitors and configured to individually connect individual said capacitors into said compensating circuit to selectively increase or decrease an energy storage capacity of said settable passive electronic energy storage device and to selectively decrease or increase the frequency of the alternating voltage.

2. A method of operating a charging station for an electrically powered vehicle, wherein the charging station draws electrical energy via an inverter from an electrical energy source connected to the charging station and the charging station has a predetermined operating frequency for charging the electrically powered vehicle, the method comprising:

generating, with the inverter and an electronic coil connected to the inverter, an alternating voltage in resonant operation, to thereby provide with the electronic coil an alternating magnetic field at the operating frequency for wireless energy-transfer coupling of the electrically powered vehicle;

providing the electronic coil connected to the inverter to have an inductance greater than an electronic coil at the electrically powered vehicle and to adjust a coupling factor between the electronic coils to less than or equal to 50%;

operating the electronic coil by way of a compensating circuit with a settable passive electronic energy storage device at the inverter for adjusting a frequency of the alternating voltage to the operating frequency by way of the compensating circuit by selectively connecting passive electronic storage devices into the compensating circuit for increasing a storage capacity and lowering the frequency of the alternating voltage and by selectively disconnecting passive electronic storage devices for decreasing the storage capacity and increasing the frequency of the alternating voltage.

3. The method according to claim 2, which comprises closed-loop controlling a frequency of the alternating voltage by way of the compensating circuit in relation to a frequency reference value.

4. A non-transitory computer readable medium, comprising a program for a computer unit of a charging station, wherein the program contains program code segments of a program for carrying out the method according to claim 2 when the program is carried out by the computer unit.

5. The non-transitory computer readable medium according to claim 4, wherein the program is loadable directly into an internal memory of the computer unit.

6. The method according to claim 2, which comprises lowering the frequency of the alternating voltage at the electronic coil by connecting additional passive electronic storage devices in the compensating circuit and increasing the frequency by disconnecting the additional passive electronic storage devices from the compensating circuit.

7. The method according to claim 6, which comprises setting the frequency of the alternating voltage by selectively connecting individual capacitors in parallel with one another.

* * * * *